United States Patent [19]

Maxey, deceased et al.

[11] Patent Number: 4,569,382
[45] Date of Patent: Feb. 11, 1986

[54] COMPOSITE OF RUBBER AND METAL REINFORCEMENT THEREFOR

[75] Inventors: Frank S. Maxey, deceased, late of Uniontown, Ohio, by Gertrude Maxey, legal representative; Syed K. Mowdood, Akron, Ohio

[73] Assignee: The Goodyear Tire & Rubber Company, Akron, Ohio

[21] Appl. No.: 262,164

[22] Filed: May 11, 1981

[51] Int. Cl.$^4$ ............................ B60C 1/00; B60C 9/02
[52] U.S. Cl. ..................................... 152/548; 156/124; 156/307.7; 156/331.5; 156/334; 156/910; 428/462; 428/465; 428/470; 524/405; 524/533; 524/535; 525/281; 525/287; 525/288; 525/296; 525/303; 525/306
[58] Field of Search ....... 156/110 A, 110 MD, 110 C, 156/124, 307.7, 307.5, 331.5, 334–335; 152/359, 356, 330 R; 525/277, 281, 287–288, 296, 302–303, 304, 306; 524/405, 529, 533–534; 428/461–463, 465, 469–470, 475.8, 476.1, 476.3, 483

[56] References Cited
U.S. PATENT DOCUMENTS 2,829,119  4/1958  Dudley et al. ................... 156/330.9
3,517,722  6/1970  Endter et al. ...................... 156/335
4,300,957  11/1981  Marencak ........................... 156/124

FOREIGN PATENT DOCUMENTS 1338930  11/1973  United Kingdom .

OTHER PUBLICATIONS

Imoto et al., "EPDM Vulcanizates", Parts V & VII, *Rubber Chemistry and Technology*, vol. 43, (1970), pp. 424–444.

Primary Examiner—Lois E. Boland
Attorney, Agent, or Firm—H. C. Young, Jr.

[57] ABSTRACT

Composite of rubber and metal reinforcement where the rubber contains borate and a cross-linkable monomer. Cured composite is useful as component for rubber tires, industrial belts and hose.

18 Claims, No Drawings

COMPOSITE OF RUBBER AND METAL REINFORCEMENT THEREFOR

FIELD OF INVENTION

This invention relates to the adhesion of metal and/or, alternately, organic or inorganic fibers, to elastomers. The invention particularly relates to a composite of rubber and wire filament or cabled filaments in the form of a cord or fiber as reinforcement therefor. The invention further relates to a composite of sulfur cured rubber and tire cord, composed of at least one metallic-plated steel filament as a reinforcement therefore, and particularly to a pneumatic or semi-pneumatic rubber tire containing such reinforcement. The invention additionally relates to rubber industrial power transmission belts, conveyor belts and to rubber hose containing such reinforcement.

BACKGROUND OF THE INVENTION

Adhesion of rubber to metal or organic or inorganic fibers has, for a long time, been the subject of considerable experimentation and research. Various solutions have been suggested and have provided various degrees of success.

For example, various physical configurations of cables wire filaments have been used to enhance physical or mechanical adhesion to rubber. Also, the surface of wire filaments has been treated by various materials and methods to enhance adhesion to rubber. Further, various materials have been mixed with the rubber itself in an effort to increase its adhesion to a cord of cabled wire filaments or organic fiber filaments.

In one aspect, boric acid, orthoboric acid, lead borate, sodium borate, and cobalt borate have been taught to be useful for aiding in the bonding of rubber to brass, bronze, iron, aluminum, and titanium. For example, see British Pat. No. 1,338,930.

Such rubber-metal reinforced composites are often applicable to tires, industrial belts and hose.

However, methods of enhancing adhesion of rubber to filament reinforcement are still being sought.

DISCLOSURE AND PRACTICE OF THE INVENTION

In accordance with this invention, a composite of rubber composition containing zinc oxide, carbon black, optionally and/or mineral fillers such as, for example, clay and/or precipitated silica, cure accelerators, fatty acid and/or metal salts thereof such as, for example, stearic acid or zinc stearate and filament reinforcement therefore is provided where said filament is selected from at least one of metal, organic and inorganic filaments, preferably metal filament, optionally a multiple of filaments cabled together to form a cord characterized in that said rubber composition contains (A) from about 0.1 to about 10, preferably about 0.2 to about 1 parts by weight per 100 parts by weight rubber (phr) of at least one borate as the product of (i) a metal selected from Group IA, IIA, IIB, IVA, IVB, and VIII of the Perodic Table of Elements, and (ii) an acid selected from boric, orthoboric, metaboric or polyboric acid, and (B) about 0.2 to about 5, preferably about 0.2 to about 2 phr of at least one monomer (cross-linkable) containing at least 2—CH=CH$_2$ units selected from at least one of triallyl phosphate, triallyl phosphite, triallyl trimellitate, diallyl phthalate, diallyl isophthalate, ethylene glycol dimethacrylate, trimethylol propane trimethacrylate, divinyl benzene, diallyl adipate, N,N'-diallyl melamine, diallyl malonate, diallyl sebacate, diallyl suberate, diallyl succinate, diallyl terephthalate, triallyl borate, N,N,'N''-triallyl citric triamide, N,N'-diallyl acrylamide, diallyl azelate, diallyl adipate, diallyl chlorendate, diallyl diglycolate, diallyl digylcol carbonae, diallyl dodecadioate, diallyl fumarate, diallyl glutarate, diallyl maleate and diallyl oxalate.

The invention also relates to such composite where the rubber composition is sulfur cured with said reinforcement.

For the borate, (A), usually sodium, potassium, lithium, barium, zinc or calcium salts of boric, orthoboric, metaboric or polyboric acid are preferred.

The combination of (A) and (B) has been observed to be particularly beneficial over the use of (A) borates alone in rubber for its adhesion to the metal cords apparently because of their synergistic effect.

Although metal filaments are preferred, an example of inorganic filament is glass and examples of well-known organic filaments are those of rayon, polyester, nylon and aramid.

In further accordance with this invention, such a composite is provided of the sulfur-vulcanized rubber composition and, containing therein as reinforcement therefor, at least one filament selected from at least one of metal, organic and inorganic, preferably metal filaments, optionally as a multiple of filaments cabled together as a cord, where said metal filament is composed of a steel filament having a microscopically thin metallic coating thereon comprised primarily of brass and/or zinc.

It is appreciated that such metallic-coated steel filament can optionally also have a thin overcoat thereon of protective compound such as, for example, benzotriazole or similarly protective compound.

In further accordance with this invention, a pneumatic and/or semi-pneumatic rubber tire is provided typically having a generally toroidal shape and comprised of a general construction containing a tread, spaced inextensible beads and sidewalls connecting said beads and tread and with a supporting carcass therefor, where said carcass is a filament-reinforced sulfur-cured rubber composite of this invention.

In addition, in accordance with this invention, an industrial article of manufacture is provided selected from at least one of industrial conveyor belt, power transmission belt, hose and vehicular tank track pads which are, at least in part, constructed of the metal filament-reinforced sulfur-vulcanized rubber composite of this invention.

It is understood that other conventional materials can be used in the compounding of the rubber which include antidegradants, tackifying resins preferably of the nonreactive type, peptizers, fillers and/or pigments and processing oils. Although it is related herein that the various mineral fillers can be used, usually the carbon black is preferred.

For the compounding of the rubber and the preparation of the wire/rubber composite, the compounding materials are simply mixed together to form the compounded rubber and applied to the filament or cord thereof, usually in a form of a textile type fabric form, such as by calendering and the resulting composite built into a green tire, industrial belt or hose construction and the product simply molded and cured with the aid of pressure to form the article of manufacture. Generally, the rubber/metal composite is cured at a temperature in the range of about 50° C. to about 200° C.

Various rubbers can be used in the practice of this invention of which unsaturated types are preferred. Representative of such unsaturated rubbers are, for example, natural rubber synthetic cis-1,4-polyisoprene, polychloroprene, cyclene rubbers, rubbery polymers of 1,3-polybutadiene, butadiene/styrene copolymers, isoprene/styrene copolymers, epichlorohydrin homo and copolymers, butadiene/acrylonitrile copolymers, EPDM rubbers, butyl rubbers, halobutyl rubbers, norbornene rubbers, thiokol rubbers and blends thereof with a minor portion of block SBS or SIS (styrene, butadiene and isoprene) copolymers.

The wire cord itself in the practice of this invention, can be composed of 1 to 50 (or more) filaments of steel wire twisted, or cabled together to form the cord. Therefore, the cord can be monofilament in nature although this is considered rare and at least four filaments are usually preferred. For example, for use in pneumatic rubber tires, cord for passenger tires might be composed of 3 to 6 cabled filaments, cord for truck tires 10 to 30 cabled filaments and cord for giant earthmover vehicle tires 40 to 50 cabled filaments.

It is generally preferred that the steel filaments themselves are individually coated, or plated, with transition metal or alloy thereof which are preferably microporous, often practically monomolecular representative of which are at least one of those selected from brass, zirconium, cerium, lanthanum, nickel, cobalt, tin, titanium, zinc, copper and bronze. Generally, an outer monomolecular, microporous layer of zinc is suitable over a very thin brass plate on the steel wire.

It is recognized that the steel wire can be plated or coated with the metal or metal alloy such as brass and/or transition metal or alloy by various methods to obtain a thin, preferably a practically monomolecular coat and usually somewhat microporous in nature. For example, electro deposition can be effected by passing the wire through a charged electrolyte bath.

It may also be feasible to use a vapor deposition technique to plate the wire.

The metal coating on the steel is generally microscopically porous, thereby understood to expose small areas of steel surface.

It is not reasonably practical to describe within rigid limits the metal plating on the steel wire. Optimum thicknesses and amounts can be a function of variables such as ratio of copper, zinc or other plating metals, nature of surface to be plated, mode of deposition, thickness of initial oxide layers, magnitude of residual stresses, as well as the reactivity of the rubber vulcanization system.

The steel wire can relate generally to what is known as carbon steel, also called ordinary steel, also called straight carbon steel or plain carbon steel, e.g., American Iron and Steel Institute Grade 1070 high carbon steel (AISI 1070). Such steel owes its properties chiefly to the presence of carbon without substantial amounts of other alloying elements. In this respect see Metals Handbook, The American Society for Metals, Metals Park.

Brass generally and preferably relates to compositions in which the major component is alpha brass, i.e., which contain from about 62 to 75 percent copper and 38 to 25 percent zinc, respectively.

The borate and cross-linkable monomer can be mixed with rubber and its compounding ingredients by conventional procedures prior to application to the metal filament (wire) or organic or inorganic fibers.

As hereinbefore pointed out, the plated wire may contain a coating of protective material such as benzotriazole and the like prior to application to the compounded rubber. Such protective agent coatings are those which are believed to somewhat interact with copper in a brass coating on the steel wire to form a polymeric complex of agent plus copper and/or zinc. This polymeric complex is insoluble in most solvents and serves as a protective barrier to environmental degradation of the underlying brass.

The practice of the present invention has been observed to result in improved aged rubber-metal adhesion, in many cases with improved initial, i.e., original adhesion of vulcanized brass-coated steel/rubber composites.

The practice of this invention is further illustrated by reference to the following example which is intended to be representative rather than restrictive of the scope of the invention. Unless otherwise indicated, all parts and percentages are by weight.

EXAMPLE I

A compounded rubber was prepared as a control by mixing a polyisoprene with various compounding ingredients which included the materials shown in the following Table 1 and the compound (compounded rubber) identified herein as Control X.

TABLE 1

| Materials | Parts (Control X) |
| --- | --- |
| Cis-1,4-polyisoprene rubber | 100 |
| Stearic acid | 2 |
| Zinc oxide | 8 |
| Antidegradants | 0.75 |
| Carbon black | 60 |
| Sulfur | 4 |
| Accelerator | 1 |
| Cobalt carboxylate of organic acid (10–11% cobalt) | 3 |
| Tackifying resin/processing oil | 4 |
| Hexamethoxymethylmelamine/resorcinol | 4 |

The recipe for the Control X compounded rubber was modified as shown in Table 2 and compounded rubber samples prepared thereby in experiments identified herein as experiments or examples A–F in Table 2 and experiments G and H in Table 3. Experiment H shows use of synergistic mixtures of additives. Pull-out adhesion tests are generally of the TCAT type although experiments G and H use a SBAT (ASTM method) type, optimally cured at 135° C.

TABLE 2

| Compounds added to Control X Recipe | Control X | A | B | C | D | E | F |
| --- | --- | --- | --- | --- | --- | --- | --- |
| Zinc borate | — | 0.94 | — | — | — | — | — |
| Calcium metaborate | — | — | 0.63 | — | — | — | — |
| Anhydrous borax | — | — | — | 0.47 | — | — | — |
| Potassium metaborate | — | — | — | — | 0.63 | — | — |
| Na$_2$B$_4$O$_7$·10 H$_2$O (Borax) | — | — | — | — | — | 0.63 | — |

TABLE 2-continued

| Compounds added to Control X Recipe | Control X | A | B | C | D | E | F |
|---|---|---|---|---|---|---|---|
| Sodium metaborate tetrahydrate | — | — | — | — | — | — | 0.63 |
| Adhesion Test: (TCAT) Pull Out Force in Newtons | | | | | | | |
| I. Original | 577 | 594 | 533 | 565 | 592 | 533 | 586 |
| II. Aged (6 days/5% NaCl in H$_2$O/94° C.) | 399 | 497 | 549 | 531 | 566 | 569 | 507 |

TABLE 3

| Compounds added to Control X Recipe | (Control X) | Experiments (phr) G | H |
|---|---|---|---|
| Sodium metaborate | — | 0.67 | 0.63 |
| Triallyl phosphate | — | — | 0.63 |
| ASTM TEST (SBAT) Pull Out Force in Lbs | | | |
| Original | 230 | 225 | 230 |
| Aged: (10 days/ 98% RH[1]/77° C.) | 157 | 198 | 247 |

[1]RH means Relative Humidity.

In this Example, the composites of rubber having filament reinforcement were tested with two types of pull-out adhesion tests, namely, the TCAT and SBAT types, optimally cured at 135° C.

The adhesion test referred to as SBAT, or Standard Block Adhesion Test, is generally set forth in ASTM test No. D2229-73.

The TCAT, or Tire Cord Adhesion Test, is also a pull-out adhesion test and its description can conveniently be more fully found in U.S. Pat. No. 4,095,465.

While certain representative embodiments and details have been shown for the purpose of illustrating the invention, it will be apparent to those skilled in this art that various changes and modifications may be made therein without departing from the spirit or scope of the invention.

What is claimed is:

1. A composite of rubber composition containing zinc oxide, carbon black, optionally and/or mineral fillers, cure accelerator(s), fatty acid and/or metal salt thereof, and containing filament reinforcement therefor, where said rubber composition is sulfur-cured with said reinforcement and where said reinforcement is selected from at least one of metal, organic and inorganic filaments, optionally a multiple of filaments cabled together to form a cord characterized in that said rubber composition contains (A) from about 0.1 to about 10 phr of at least one borate as the product of (i) a metal selected from Group IA, IIA, IIB, IVA, IVB and VIII of the Perodic Table of Elements, and (ii) an acid selected from boric, orthoboric, metaboric or polyboric acid, and (B) about 0.2 to about 5 phr of at least one monomer (cross-linkable) containing at least two —CH=CH$_2$ units selected from at least one of triallyl phosphate, triallyl phosphite, triallyl trimellitate, diallyl phthalate, diallyl isophthalate, ethylene glycol dimethacrylate, trimethylol propane trimethacrylate, divinyl benzene, diallyl adipate, N,N'-diallyl lelamine, diallyl malonate, diallyl sebacate, diallyl suberate, diallyl succinate, diallyl terephthalate, triallyl borate, N,N',n"-triallyl citric triamide, N,N'-diallyl acrylamide, diallyl azelate, diallyl adipate, diallyl chlorendate, diallyl diglycolate, dialyl diglycol carbonate, diallyl dodecadioate, diallyl fumarae, diallyl glutarate, diallyl maleate and dialyl oxalate.

2. The composite of claim 1 where said reinforcement is a steel filament having a microscopically porous coating thereon composed primarily of brass and/or zinc.

3. The composite of claim 1 where the metal (i) is selected from sodium, potassium, lithium, barium, calcium or zinc.

4. The composite of claim 1 where the borate of (A) is selected from at least one of zinc borate and sodium metaborate and where the monomer (B) is selected from at least one of triallyl phosphate and diallyl phthalate.

5. The composite of claim 2 where said steel filament has an outer, thin, practically monomolecular microporous metal coating thereon selected from at least one of zirconium, cerium, lanthanum, nickel, cobalt, tin, titanium, zinc, copper, brass and bronze plated on the steel wire.

6. The composite of claim 2 where said steel filament is brass coated and the brass coat itself has an outer coat of zinc.

7. The composite of claim 5 or 6 where said steel is carbon steel and the major component of said brass is alpha brass.

8. The composite of claim 5 or 6 where said wire filament has a protective overcoat of benzotriazole.

9. The composite of claims 1, or 2 where said rubber is selected from at least one of natural rubber, synthetic cis 1,4-polysioprene, polychloroprene, cyclene rubbers, rubbery polymers derived from 1,3-butadiene, butadiene/styrene copolymers, isoprene/styrene copolymers, epichlorohydrin homo and copolymers, butadiene/acrylonitrile copolymers, EPDM rubbers, butyl rubbers, halobutyl rubbers, norbornene rubbers, thiokol rubbers and blends thereof.

10. A pneumatic or semi-pneumatic rubber tire having a generally toroidal shape and comprised of a general construction containing a tread, spaced inextensible beads and sidewalls connecting said beads and tread and with a supporting carcass therefor, where said carcass is a metal cord-reinforced sulfur-cured rubber composite of claim 1.

11. The rubber tire of claim 10 where said cord is composed of about 2 to about 50 cabled metal-plated steel filaments, said filament composed of steel filament having a microscopically porous metal coating thereon composed primarily of brass and/or zinc.

12. The tire of claim 12 where said steel filament has an outer, thin, practically monomolecular microporous metal coating thereon selected from at least one of zirconium, cerium, lanthanum, nickel, cobalt, tin, titanium, zinc, copper, brass and bronze plated on the steel wire.

13. The tire of claim 11 where said steel filaments have an outer coating of brass and said brass itself has an outer coat of zinc.

14. The tire of claim 12 or 13 where said steel is carbon steel and the major component of said brass is alpha brass.

15. The tire of claim 12 or 13 where said wire filament has a protective overcoat of benzotriazole.

16. The tire of claims 10, 11 or 12 where said rubber is selected from at least one of natural rubber, synthetic cis-1,4-polyisoprene, polychloroprene, cyclene rubbers, rubbery polymers derived from 1,3-butadiene, butadiene/styrene copolymers, isoprene/styrene copolymers, epichlorohydrin homo and copolymers, butadiene/acrylonitrile copolymers, EPDM rubbers, butyl rubbers, halobutyl rubbers, norbornene rubbers, thiokol rubbers and blends thereof.

17. The tire of claim 10, 11 or 12 where the borate of (A) is selected from at least one of zinc borate and sodium metaborate and the monomer (B) is selected from at least one of triallyl phosphate and diallyl phthalate.

18. An industrial article of manufacture selected from at least one of industrial conveyor belt, power transmission belt and hose which are, at least in part, constructed of the metal cord-reinforced sulfur-vulcanized rubber composite of claims 1, or 2.

* * * * *

UNITED STATES PATENT AND TRADEMARK OFFICE
CERTIFICATE OF CORRECTION

PATENT NO. : 4,569,382
DATED : February 11, 1986
INVENTOR(S) : Frank S. Maxey and Syed K. Mowdood It is certified that error appears in the above-identified patent and that said Letters Patent is hereby corrected as shown below:

Column 5, line 62, claim 1 "melamine" misspelled.

Column 5, line 68, claim 1 "fumarate" misspelled.

Column 6, line 58, claim 11 should depend from claim 10.

Signed and Sealed this

Twenty-sixth Day of August 1986

[SEAL]

Attest:

DONALD J. QUIGG

Attesting Officer

Commissioner of Patents and Trademarks